(12) United States Patent
Cannan et al.

(10) Patent No.: US 11,028,318 B2
(45) Date of Patent: Jun. 8, 2021

(54) PROPPANT COMPOSITIONS AND METHODS OF USE

(71) Applicants: National Technology & Engineering Solutions of Sandia, LLC, Albuquerque, NM (US); CARBO Ceramics Inc., Houston, TX (US); STC.UNM, Albuquerque, NM (US)

(72) Inventors: Chad Cannan, Cypress, TX (US); Terrence Palisch, Richardson, TX (US); Richard A. Kemp, Albuquerque, NM (US); Timothy J. Boyle, Albuquerque, NM (US); Bernadette A. Hernandez-Sanchez, Albuquerque, NM (US); James E. Miller, Albuquerque, NM (US)

(73) Assignees: National Technology & Engineering Solutions of Sandia, LLC, Albuquerque, NM (US); CARBO Ceramics Inc., Houston, TX (US); UNM Rainforest Innovations, Albuquerque, NM (US)

( * ) Notice: Subject to any disclaimer, the term of this patent is extended or adjusted under 35 U.S.C. 154(b) by 94 days.

(21) Appl. No.: 16/133,844

(22) Filed: Sep. 18, 2018

(65) Prior Publication Data
US 2019/0016950 A1 Jan. 17, 2019

Related U.S. Application Data

(62) Division of application No. 14/488,989, filed on Sep. 17, 2014, now Pat. No. 10,106,727.

(51) Int. Cl.
*C09K 8/80* (2006.01)
*E21B 47/11* (2012.01)
*E21B 43/267* (2006.01)

(52) U.S. Cl.
CPC ............ *C09K 8/80* (2013.01); *C09K 8/805* (2013.01); *E21B 43/267* (2013.01); *E21B 47/11* (2020.05)

(58) Field of Classification Search
None
See application file for complete search history.

(56) References Cited

U.S. PATENT DOCUMENTS

| 2,378,817 A | 6/1945 | Wrightsman et al. |
| 2,675,335 A | 4/1954 | Rankin et al. |

(Continued)

FOREIGN PATENT DOCUMENTS

| EP | 1355038 A1 | 10/2003 |
| GB | 1401303 | 7/1975 |

(Continued)

OTHER PUBLICATIONS

Masters, K., "Spray Drying Handbook," John Wiley and Sons, New York (1979).

(Continued)

*Primary Examiner* — Jeffrey D Washville
(74) *Attorney, Agent, or Firm* — Daniel J. Jenkins

(57) ABSTRACT

Proppant compositions for use in hydraulic fracturing and methods of using same are disclosed herein. The proppant compositions include a plurality of proppant particulates and at least one particulate of the plurality of proppant particulates containing at least one tracer, wherein the at least one tracer separates from the at least one particulate located inside a fracture of a subterranean formation after a period of time.

9 Claims, 4 Drawing Sheets

(56) References Cited

U.S. PATENT DOCUMENTS

| | | | |
|---|---|---|---|
| 3,533,829 A | 10/1970 | Quanquin | |
| 4,179,429 A | 12/1979 | Hanauye et al. | |
| 4,427,068 A | 1/1984 | Fitzgibbon | |
| 4,440,866 A | 4/1984 | Lunghofer et al. | |
| 4,522,731 A | 6/1985 | Lunghofer | |
| 4,623,630 A | 11/1986 | Fitzgibbon | |
| 4,658,899 A | 4/1987 | Fitzgibbon | |
| 4,873,145 A | 10/1989 | Okada et al. | |
| 4,879,181 A | 11/1989 | Fitzgibbon | |
| 4,888,240 A | 12/1989 | Graham et al. | |
| 5,218,038 A | 6/1993 | Johnson et al. | |
| 5,964,291 A | 10/1999 | Bourne et al. | |
| 6,279,656 B1 | 8/2001 | Sinclair et al. | |
| 7,036,591 B2 | 5/2006 | Cannan et al. | |
| 7,598,209 B2 | 10/2009 | Kaufman et al. | |
| 8,399,597 B2 | 3/2013 | Pullichola et al. | |
| 2006/0177661 A1 | 8/2006 | Smith et al. | |
| 2008/0015103 A1 | 1/2008 | Luscher et al. | |
| 2008/0210421 A1* | 9/2008 | Wilson | E21B 43/267 166/254.1 |
| 2009/0250216 A1 | 10/2009 | Bicerano | |
| 2010/0250207 A1 | 9/2010 | Rodney | |
| 2010/0314108 A1 | 12/2010 | Crews et al. | |
| 2011/0177984 A1 | 7/2011 | Wilson et al. | |
| 2012/0181020 A1 | 7/2012 | Barron et al. | |
| 2013/0126158 A1* | 5/2013 | Gupta | E21B 47/11 166/250.12 |
| 2013/0138408 A1 | 5/2013 | Lee et al. | |
| 2014/0000891 A1 | 1/2014 | Mahoney et al. | |
| 2014/0187449 A1 | 7/2014 | Khabashesku et al. | |
| 2014/0190686 A1 | 7/2014 | Cannan et al. | |

FOREIGN PATENT DOCUMENTS

| | | |
|---|---|---|
| GB | 2528716 A | 2/2016 |
| WO | 2005100746 A1 | 10/2005 |
| WO | 2013192634 A2 | 12/2013 |
| WO | 2014004815 A1 | 1/2014 |
| WO | 2014110121 A1 | 7/2014 |
| WO | 2014144464 A2 | 9/2014 |

OTHER PUBLICATIONS

Procedure 106-87-S of the American Foundry Society Mold and Core Test Handbook.

* cited by examiner

PROPPANT COMPOSITIONS AND METHODS OF USE

CROSS-REFERENCE TO RELATED APPLICATION

This application is a divisional application of U.S. patent application Ser. No. 14/488,989, filed Sep. 17, 2014, entitled "PROPPANT COMPOSITIONS AND METHODS OF USE," which is hereby incorporated by reference in its entirety.

STATEMENT OF GOVERNMENTAL INTEREST

The United States Government has rights in this invention pursuant to Contract No. DE-AC04-94AL85000 between the United States Department of Energy and Sandia Corporation and Contract No. DE-NA0003525 awarded by the United States Department of Energy/National Nuclear Security Administration, both for the operation of the Sandia National Laboratories.

TECHNICAL FIELD

The present invention relates to proppant compositions and methods for hydraulically fracturing an oil or gas well. More particularly, the present invention relates to methods for evaluating the effectiveness and performance of a hydraulic fracturing stimulation treatment in an oil or gas well with a proppant composition containing a tracer.

BACKGROUND

In order to stimulate and more effectively produce hydrocarbons from oil and gas bearing formations, and especially formations with low porosity and/or low permeability, induced fracturing (called "frac operations", "hydraulic fracturing", or simply "fracing") of the hydrocarbon-bearing formations has been a commonly used technique. In a typical hydraulic fracturing operation, fluid slurries are pumped downhole under high pressure, causing the formations to fracture around the borehole, creating high permeability conduits that promote the flow of the hydrocarbons into the borehole. The high pressure fluids exit the borehole via perforations through the casing and surrounding cement, and cause the oil and gas formations to fracture, usually in thin, generally vertical sheet-like fractures in the deeper formations in which oil and gas are commonly found. The high-pressure fluids typically contain particulate materials called a proppant that is generally composed of sand, resin-coated sand or ceramic particulates. After the proppant has been placed in the fracture and the fluid pressure relaxed, the fracture is prevented from completely closing by the presence of the proppants. As many as 40 separate hydraulic fracturing operations, or stages, can be conducted in a single well.

Tracers have been used in connection with hydraulic fracturing, to provide certain types of diagnostic information about the location and orientation of the fracture(s). This can be accomplished by placing one or more unique tracers in various portions of the fracturing operation, such as in different stages if multiple fracturing stages are performed in the well or in different portions of a stage. Analysis of the produced fluids for the presence of the tracers can provide diagnostic information as to which stages or portions of a stage are in contact with the produced fluids. However, these tracers have been limited to radioactive particles and liquid chemicals of a proprietary nature that are pumped in the fracturing fluid and recovered relatively early in the life of the well.

It would be desirable to have a tracer technology that can provide a very large number of unique tracers that are not subject to degradation at the high temperatures and pressures, along with varying salinity and pH, which are oftentimes found in well formations.

SUMMARY

Proppant compositions for use in hydraulic fracturing are disclosed herein. The proppant compositions can include a plurality of proppant particulates and at least one particulate of the plurality of proppant particulates can contain at least one tracer, wherein the at least one tracer can separate from the at least one particulate located inside a fracture of a subterranean formation after a period of time. The at least one tracer can include a nanoparticle containing a dopant. The dopant can include one or more elements selected from the lanthanide series, the actinide series, transition metals having an atomic number of 21 or greater, or p-block metals having an atomic number of 31 or greater, or any combination thereof.

Methods of hydraulic fracturing a subterranean formation are also disclosed herein. The methods can include injecting a hydraulic fluid into a subterranean formation at a rate and pressure sufficient to open a fracture therein and injecting a fluid containing a proppant composition. The proppant composition can include a plurality of particulates. At least one particulate of the plurality of particulates can include at least one tracer and the at least one tracer can separate from the at least one particulate located inside a fracture after a period of time. The at least one tracer can include a nanoparticle containing a dopant. The dopant can include one or more elements selected from the lanthanide series, the actinide series, transition metals having an atomic number of 21 or greater, or p-block metals having an atomic number of 31 or greater, or any combination thereof.

Methods of diagnostic evaluation of a hydraulic fracturing stimulation of a subterranean formation are also disclosed herein. The methods can include injecting a hydraulic fluid into at least one stage of the subterranean formation at a rate and pressure sufficient to open a fracture therein. The subterranean formation can contain one or more formation fluids and the hydraulic fluid can include a proppant composition containing a plurality of particulates. At least one of particulate of the plurality of particulates can contain at least one tracer and the at least one tracer can separate from the proppant composition continuously over a period of time. The at least one tracer can return to the surface with the formation fluids and the at least one tracer can be recovered and identified. The at least one tracer can include a nanoparticle containing a dopant. The dopant can include one or more elements selected from the lanthanide series, the actinide series, transition metals having an atomic number of 21 or greater, or p-block metals having an atomic number of 31 or greater, or any combination thereof.

BRIEF DESCRIPTION OF THE DRAWINGS

The present invention may best be understood by referring to the following description and accompanying drawings that are used to illustrate embodiments of the invention. In the drawings.

DETAILED DESCRIPTION

Figure 1:
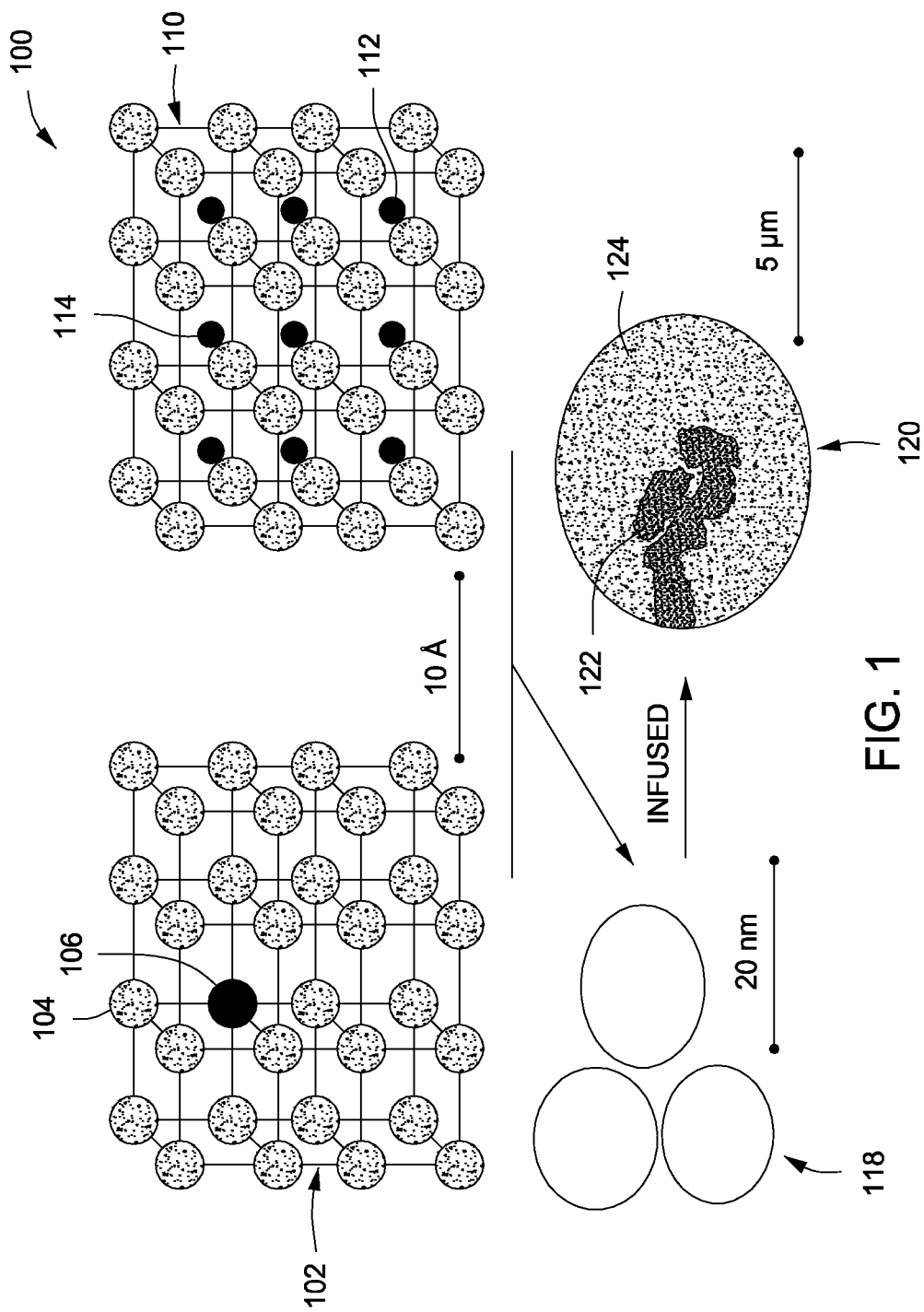
FIG. 1 depicts an illustration of monocationic atomistic doping and polycationic atomistic doping on a nanoscale and a microscale, according to several exemplary embodiments as described herein.

In the following description, numerous specific details are set forth. However, it is understood that embodiments of the invention may be practiced without these specific details. In other instances, well-known structures and techniques have not been shown or described in detail in order not to obscure the understanding of this description. Additionally, as used herein, the term "exemplary" is intended to mean serving as an illustration or example, and is not intended to indicate a preference.

The term "apparent specific gravity," as used herein, is the weight per unit volume (grams per cubic centimeter) of the particulates, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples.

The term "conductivity," as used herein, is defined as the product of the width of the created fracture and the permeability of the proppant that remains in the fracture.

The term "high density proppant," as used herein, means a proppant having an apparent specific gravity of greater than 3.4 g/cm$^3$.

The term "intermediate density proppant," as used herein, means a proppant having an apparent specific gravity of from about 3.1 to 3.4 g/cm$^3$.

The term "internal interconnected porosity," as used herein, is defined as a percentage of the pore volume, or void volume space, over the total volume of a porous ceramic particulate or porous ceramic proppant.

The term "light weight proppant," as used herein, means a proppant having an apparent specific gravity of less than 3.0 g/cm$^3$.

The term "degradable," as used herein, means the ability of a chemical or coating to react to dissolve or breakdown into smaller components under one or more downhole conditions.

The term "infuse," as used herein, means to inject, attach, introduce, or otherwise include a material into a porous substrate, such as a porous ceramic.

The term "ceramic," as used herein, means any non-metallic, inorganic solid material.

The term "synthetic ceramic proppant," as used herein, means any man-made or synthetic ceramic particulate(s).

The term "proppant," as used herein, means material that includes one or more (e.g., tens, hundreds, thousands, millions, or more) of individual proppant particles, particulates or elements.

The term "tracer," as used herein, means a nanoparticle or tag material capable of being distinguished from a nanomaterial removed from the fractured subterranean formation.

The term "nanoparticle," as used herein, means a particle having at least one dimension between 1 and 100 nanometers.

According to certain exemplary embodiments of the present invention, a proppant particulate containing one or more tracers is disclosed. The one or more tracers can be disposed on, attached to, coated on, absorbed into, infused into, or otherwise combined with the proppant particulate to produce the proppant containing one or more tracers, also referred to as a tracer containing proppant particulate. The proppant particulate can be or include a ceramic particulate. The tracer containing proppant particulate can be synthetic and/or naturally occurring. For example, the tracer containing proppant particulate can include sand, proppant, porous synthetic ceramic proppant, and non-porous synthetic ceramic proppant. The tracer containing proppant particulate can also be coated with a resin and/or epoxy material. In an embodiment, the coating can include or otherwise contain the tracer. The tracer containing proppant particulate can also be uncoated.

Also according to certain exemplary embodiments of the present invention, a proppant composition for use in hydraulic fracturing is disclosed. The composite proppant composition can include at least one proppant particulate containing a tracer. In an embodiment, at least a portion of the proppant composition can include a porous ceramic particulate containing a tracer. Also, according to certain embodiments of the present invention, the proppant composition can include a non-porous proppant portion and a porous proppant portion, wherein at least a portion of the porous proppant contains the tracer. Furthermore, according to certain embodiments of the present invention, the permeability and conductivity of the composite proppant composition is at least equal to the permeability and conductivity of the non-porous proppant part alone.

The porous ceramic proppant has an internal porosity, or percent (%) porosity. The internal porosity of the porous ceramic proppant can be infused with the tracer so that the porous ceramic proppant acts as a carrier for the tracer in a hydraulic fracturing operation. By tailoring the type of porous ceramic proppant used as a carrier, any potential impact to proppant conductivity by using the porous ceramic proppant can be avoided. According to certain embodiments of the present invention, the tracer can be or can contain one or more nanoparticles or nanoparticle substrates which can include one or more metallic or non-metallic dopants disposed thereon, contained therein, infused into, and/or otherwise attached thereto. The metallic or non-metallic dopant can be or include any one or more elements from the Periodic Table, such as the Ln and/or An Groups. The nanoparticle or nanoparticle substrate can be or include a ceramic matrix and the one or more dopants can be contained therein and/or attached thereto.

The tracer can survive or remain stable under any suitable downhole conditions. According to several exemplary embodiments, the tracer is survivable under temperatures of at least about 100° C., at least about 125° C., at least about 150° C., at least about 300° C., at least about 500° C., at least about 750° C., at least about 1,000° C., or at least about 2,000° C. or more. According to several exemplary embodiments, the tracer is not degradable under downhole conditions. According to several exemplary embodiments, the tracer is not degradable under temperatures of at least about 100° C., at least about 125° C., at least about 150° C., at least about 300° C., at least about 500° C., at least about 750° C., at least about 1,000° C., or at least about 2,000° C. or more.

The tracer can have any suitable size. The tracer can have a size from about 1 nanometers (nm), about 5 nm, about 10 nm, about 50 nm, about 100 nm, about 500 nm, or about 1,000 to about 2,000 nm, about 5,000 nm, about 10,000 nm, about 15,000 nm, or about 20,000 nm in its largest dimension. For example, the tracer can be from about 2 nm to about 25,000 nm, about 25 nm to about 15,000 nm, about 50 nm to about 10,000 nm, about 150 nm to about 7,500, about 250 nm to about 4,000 nm, or about 750 nm to about 1,500 nm in its largest dimension. The tracer can also be from about 2 nm to about 2,000 nm, about 20 nm to about 500 nm, about 40 nm to about 300 nm, about 50 nm to about 250 nm, about 75 nm to about 200 nm, or about 100 nm to about 150 nm in its largest dimension.

In one or more exemplary embodiments of the present invention, the tracer is nano-sized or is a nanoparticle. For example, the tracer can have a size less than 100 nm, less than 95 nm, less than 90 nm, less than 85 nm, less than 80 nm, less than 75 nm, less than 70 nm, less than 65 nm, less than 60 nm, less than 55 nm, less than 50 nm, less than 45 nm, less than 40 nm, less than 35 nm, less than 30 nm, less than 25 nm, less than 20 nm, less than 15 nm, less than 10 nm, less than 5 nm, less than 2 nm, or less than 1 nm in its largest dimension.

The nanoparticle substrate of the tracer can include any suitable metallic and/or non-metallic material. The nanoparticle substrate can include any metal selected from Groups 3-12 of the Periodic Table or any oxides thereof. The nanoparticle substrate can also include any alkali metal, alkali earth metal, or post-transition metal or any oxides thereof. For example, the nanoparticle substrate can include silicon, aluminum, zirconium, iron, magnesium, bismuth, calcium, cerium, borates, or oxides thereof, or any combination or mixture thereof. The nanoparticle substrate phase can also include halites, perovskites, rock salt, scheelite, spinels, zinc blend, wurtzite, varying metal oxide phases or the like, or any combination or mixture thereof.

The dopant of the tracer can include any suitable metallic and/or non-metallic material that can be unique to or distinguishable from drilling fluids, hydraulic fracturing fluids, cement, or any other materials in or from a subterranean environment. For example, the dopant can be or include any one or more elements from the Periodic Table that are or can be unique to or distinguishable from drilling fluids, hydraulic fracturing fluids, cement, or any other materials in or from a subterranean environment. The dopant can include any element from the lanthanide series, the actinide series, transition metals having an atomic number of 21 or greater and p-block metals having an atomic number of 31 or greater. The dopant can also include lanthanum, cerium, praseodymium, neodymium, promethium, samarium, europium, gadolinium, terbium, dysprosium, holmium, erbium, thulium, ytterbium, hafnium, tantalum, tungsten, rhenium, osmium, iridium, platinum, rutherfordium, dubnium, bohrium, hassium, tin, lead, thallium, or indium, or any combination or mixture thereof.

The dopant can be encapsulated by, coated on, bonded with, incorporated into, integrated with, or otherwise attached to the nanoparticle substrate. The dopant can also be molecularly bonded with the nanoparticle substrate. For example, the dopant can be monocationically and/or polycationically bonded to or doped into the nanoparticle substrate.

In an embodiment, the dopant may be coated on, bonded with, incorporated into, integrated with, or otherwise attached to a particulate that is a portion of the proppant. The dopant can also be molecularly bonded with the particulate. For example, the dopant can be monocationically and/or polycationically bonded to or doped into the particulate. For example, the dopant may be introduced to the particulate as a soluble salt, such as, but not limited to chlorides, bromides, and nitrates, and thereafter the cation of the soluble salt is precipitated to coat and/or adhere the dopant to the particulate.

According to several exemplary embodiments, monocationic atomistic doping includes the preparation of the nanoparticle substrate that is doped with an identifying secondary cation or tracer component. The nanoparticle substrate can include any suitable metal oxides such as ceramic metal oxides. For example, the nanoparticle substrate can be a ceramic matrix that can include $M^{3+}$ containing oxides such as yttrium oxide ($Y_2O_3$), alumina ($Al_2O_3$), or combination thereof. The intermediate size of the $M^{3+}$ ion can allow for the accommodation of a wide range of dopants, for example, substitution of the $M^{3+}$ ion by another identifying $M^{3+}$ ion. The dopants can include cations from the lanthanide group ($Ln^{3+}$), which demonstrate unique emission signatures that can otherwise be absent in downhole compositions. The lanthanide containing dopants can also remain stable under downhole conditions. The $Y_2O_3$ matrix can be used in fluorescence emissions and can be used with other Ln cations to generate characteristic emissions. For example, up to about 20 combinations can be measured if only Ln cations are used as tracers and up to about 30 combinations can be measured if cations from the actinide group (An) are used along with Ln as tracers. More than 30 combinations can be measured if similar sized p-block cations are also included as tracers with the Ln and An cations. Additional co-doping can also increase the number of tracers.

According to several exemplary embodiments, the monocationic atomistic doping is modified to employ easily substituted but stable material phases as the supporting nanoparticle substrate. The modified monocationic atomistic doping, or polycationic atomistic doping, can allow for solid solutions of the various materials to be generated, often with a much more complex set of accessible matrices, including rock-salt, silicates, perovskites, scheelites, spinels, etc. As an example, the perovskites can support a broad range and a large number of dopants. This nanoparticle substrate has the general formal composition of $ABO_3$, where the A component of the nanoparticle substrate can be replaced with a first dopant and the B component of the nanoparticle substrate can be replaced with a second dopant. It is also possible for perovskites to be non-stoichiometric in which the formal ratios of elements A, B, and O differ slightly from the idealized 1.0, 1.0, and 3.0 values so that there not a strict $ABO_3$ formula. A typical manner of noting these non-exact oxides is $A^xA'_{(1-x)}B_yB'_{(1-y)}O_{(3-\delta)}$. The first dopant, substituted for the A component, can include any element from the alkaline earths, lanthanide series, the actinide series, transition metals having an atomic number of 21 or greater and p-block metals having an atomic number of 31 or greater. The second dopant, substituted for the B component, can also include any element from the lanthanide series, the actinide series, transition metals having an atomic number of 21 or greater and p-block metals having an atomic number of 31 or greater. For example, perovskites can have a general composition of $ABO_3$, where $A$=Ln or Sn and $B$=Zr, Hf, Nb, Ta or Ln. Also, a generic composition of $A^{2+}M^{4+}O_3$:X, wherein X also represents a tracer component or dopant, and can include a specific example of $CaTiO_3$:Ce. The A and B components of the nanoparticle substrate can be replaced with any suitable metal. For example, the dopant may be introduced to the particulate as a soluble salt, such as, but not limited to chlorides, bromides, and nitrates, and thereafter the cation of the soluble salt is precipitated to coat and/or adhere to the particulate.

FIG. 1 depicts an illustration 100 of monocationic atomistic doping and polycationic atomistic doping on a nanoscale and a microscale, according to several exemplary embodiments. A monocationically doped nanoparticle 102 having the formula $M_2O_3$:X can include a nanoparticle substrate 104 having the formula $M_2O_3$ doped with a dopant, or X, 106. A polycationically doped nanoparticle 106 having the formula $ABO_3$:X can include a nanoparticle substrate 110 having the formula $ABO_3$ doped with a dopant, or X, 114. On a nanoscale, the monocationically doped nanoparticle 102 and the polycationically doped nanoparticle 106 would each appear as particles 118. The particles 118 can be infused into pores or channels 122 of a proppant particulate 120 to provide a tagged proppant particulate 124.

According to several exemplary embodiments, the nanoparticle substrates 102, 110 are each coated with or encapsulated by one or more core-shell coatings (not shown) to provide one or more core-shell nanoparticles (not shown). The core-shell coatings can include silica or polymeric compounds. The core-shell coatings can also be doped with the one or more dopants to even further increase the number of unique tracers. The core-shell coatings can also be doped with any element from the periodic table. In several exemplary embodiments, the $ABO_3$:X material is coated or encapsulated with a silica coating that is doped with any element from the lanthanide series, the actinide series, transition metals having an atomic number of 21 or greater and p-block metals having an atomic number of 31 or greater.

According to several exemplary embodiments, the proppant composition includes a plurality of any suitable proppant particulates. Suitable proppant particulates can be any one or more of lightweight ceramic proppant, intermediate strength proppant, high strength ceramic proppant, natural frac sand, porous ceramic proppant, glass beads, natural proppant such as walnut hulls, and any other man-made, natural, ceramic or glass proppant. According to several exemplary embodiments, the proppant particulates include silica and/or alumina in any suitable amounts. According to several exemplary embodiments, the proppant particulates include less than 80 wt %, less than 60 wt %, less than 40 wt %, less than 30 wt %, less than 20 wt %, less than 10 wt %, or less than 5 wt % silica based on the total weight of the proppant particulates. According to several exemplary embodiments, the proppant particulates include from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the proppant particulates include at least about 30 wt %, at least about 50 wt %, at least about 60 wt %, at least about 70 wt %, at least about 80 wt %, at least about 90 wt %, or at least about 95 wt % alumina based on the total weight of the proppant particulates. According to several exemplary embodiments, the proppant particulates include from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

According to several exemplary embodiments, the proppant composition includes proppant particulates that are substantially round and spherical having a size in a range between about 6 and 270 U.S. Mesh. For example, the size of the particulates can be expressed as a grain fineness number (GFN) in a range of from about 15 to about 300, or from about 30 to about 110, or from about 40 to about 70. According to such examples, a sample of sintered particulates can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

According to several exemplary embodiments, the proppant composition includes proppant particulates having any suitable size. For example, the proppant particulates can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the proppant particulates have a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the proppant particulates have a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

According to several exemplary embodiments, the proppant composition includes proppant particulates having any suitable shape. The proppant particulates can be substantially round, cylindrical, square, rectangular, elliptical, oval, egg-shaped, or pill-shaped. For example, the proppant particulates can be substantially round and spherical. According to several exemplary embodiments, the proppant particulates of the proppant composition have an apparent specific gravity of less than 3.1 $g/cm^3$, less than 3.0 $g/cm^3$, less than 2.8 $g/cm^3$, less than 2.5 $g/cm^3$, less than 2.2 $g/cm^3$, or less than 1.9 $g/cm^3$. According to several exemplary embodiments, the proppant particulates have an apparent specific gravity of from, about 1.6 to about 4.5 $g/cm^3$, about 1.8 to about 2.6 $g/cm^3$, about 2.3 to about 3.2 $g/cm^3$, or about 3.1 to 3.4 $g/cm^3$. According to several exemplary embodiments, the proppant particulates have an apparent specific gravity of greater than 3.4 $g/cm^3$, greater than 3.6 $g/cm^3$, greater than 4.0 $g/cm^3$, or greater than 4.5 $g/cm^3$.

According to several exemplary embodiments, the proppant composition includes porous proppant particulates having any suitable porosity. The porous proppant particulates can include an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, or about 45% or more. In several exemplary embodiments, the internal interconnected porosity of the porous ceramic proppant is from about 5 to about 35%, about 5 to about 15%, or about 15 to about 35%. According to several exemplary embodiments, the proppant composition includes porous proppant particulates having any suitable average pore size. The porous proppant particulates can have an average pore size that is at least larger than the size of the tracer component in its largest dimension. For example, the porous proppant particulates can have an average pore size from about 2 nm, about 10 nm, about 15 nm, about 55 nm, about 110 nm, about 520 nm, or about 1,100 to about 2,200 nm, about 5,500 nm, about 11,000 nm, about 17,000 nm, or about 25,000 nm or more in its largest dimension. For example, the porous proppant particulates can have an average pore size can be from about 3 nm to about 30,000 nm, about 30 nm to about 18,000 nm, about 200 nm to about 9,000, about 350 nm to about 4,500 nm, or about 850 nm to about 1,800 nm in its largest dimension.

According to several exemplary embodiments, the proppant composition includes porous and/or non-porous proppant particulates having any suitable permeability and conductivity in accordance with ISO 13503-5: "Procedures for Measuring the Long-term Conductivity of Proppants," and expressed in terms of Darcy units, or Darcies (D). The tracer containing proppant particulates can have a long term permeability at 7,500 psi of at least about 1 D, at least about 2 D, at least about 5 D, at least about 10 D, at least about 20 D, at least about 40 D, at least about 80 D, at least about 120 D, or at least about 150 D. The tracer containing proppant particulates can have a long-term permeability at 12,000 psi of at least about 1 D, at least about 2 D, at least about 3 D, at least about 4 D, at least about 5 D, at least about 10 D, at least about 25 D, or at least about 50 D. The tracer containing proppant particulates can have a long-term conductivity at 7,500 psi of at least about 100 millidarcy-feet (mD-ft), at least about 200 mD-ft, at least about 300 mD-ft, at least about 500 mD-ft, at least about 1,000 mD-ft, at least about 1,500 mD-ft, at least about 2,000 mD-ft, or at least about 2,500 mD-ft. For example, the tracer containing proppant particulates can have a long term conductivity at 12,000 psi of at least about 50 mD-ft, at least about 100 mD-ft, at least about 200 mD-ft, at least about 300 mD-ft, at least about 500 mD-ft, at least about 1,000 mD-ft, or at least about 1,500 mD-ft.

According to several exemplary embodiments, at least a portion of the proppant particulates of the proppant composition are coated with a resin material. According to several exemplary embodiments, at least about 50%, at least about 75%, at least about 85%, at least about 90%, at least about 95%, or least about 99% of the proppant particulates in the proppant composition are coated with the resin material. One or more of the tracer containing proppant particulates in the proppant composition can be coated with the resin material. In one or more exemplary embodiments, all of the proppant particulates in the proppant composition can be coated with the resin material.

According to several exemplary embodiments, at least a portion of the surface area of each of the coated proppant particulates is covered with the resin material. According to several exemplary embodiments, at least about 10%, at least about 25%, at least about 50%, at least about 75%, at least about 90%, at least about 95%, or at least about 99% of the surface area of the coated proppant particulates is covered with the resin material. According to several exemplary embodiments, about 40% to about 99.9%, about 85% to about 99.99%, or about 98% to about 100% of the surface area of the coated proppant particulates is covered with the resin material. According to several exemplary embodiments, the entire surface area of the coated proppant particulates is covered with the resin material. For example, the coated proppant particulates can be encapsulated with the resin material.

According to several exemplary embodiments, the resin material is present on the resin coated proppant particulates in any suitable amount. According to several exemplary embodiments, the resin coated proppant particulates contain at least about 0.1 wt % resin, at least about 0.5 wt % resin, at least about 1 wt % resin, at least about 2 wt % resin, at least about 4 wt % resin, at least about 6 wt % resin, at least about 10 wt % resin, or at least about 20 wt % resin, based on the total weight of the resin coated proppant particulates. According to several exemplary embodiments, the resin coated proppant particulates contain about 0.01 wt %, about 0.2 wt %, about 0.8 wt %, about 1.5 wt %, about 2.5 wt %, about 3.5 wt %, or about 5 wt % to about 8 wt %, about 15 wt %, about 30 wt %, about 50 wt %, or about 80 wt % resin, based on the total weight of the resin coated proppant particulates.

According to several exemplary embodiments, the resin material includes any suitable resin. For example, the resin material can include a phenolic resin, such as a phenol-formaldehyde resin. According to several exemplary embodiments, the phenol-formaldehyde resin has a molar ratio of formaldehyde to phenol (F:P) from a low of about 0.6:1, about 0.9:1, or about 1.2:1 to a high of about 1.9:1, about 2.1:1, about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1. The phenol-formaldehyde resin can also have a molar ratio of formaldehyde to phenol of about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

According to several exemplary embodiments, the phenol-formaldehyde resin has a molar ratio of less than 1:1, less than 0.9:1, less than 0.8:1, less than 0.7:1, less than 0.6:1, or less than 0.5:1. For example, the phenol-formaldehyde resin can be or include a phenolic novolac resin. Phenolic novolac resins are well known to those of ordinary skill in the art, for instance see U.S. Pat. No. 2,675,335 to Rankin, U.S. Pat. No. 4,179,429 to Hanauye, U.S. Pat. No. 5,218,038 to Johnson, and U.S. Pat. No. 8,399,597 to Pullichola, the entire disclosures of which are incorporated herein by reference. Suitable examples of commercially available novolac resins include novolac resins available from Plenco™, Durite® resins available from Momentive, and novolac resins available from S.I. Group.

According to several exemplary embodiments, the phenol-formaldehyde resin has a weight average molecular weight from a low of about 200, about 300, or about 400 to a high of about 1,000, about 2,000, or about 6,000. For example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. The phenol-formaldehyde resin can also have a weight average molecular weight of about 175 to about 800, about 700 to about 3,330, about 1,100 to about 4,200, about 230 to about 550, about 425 to about 875, or about 2,750 to about 4,500.

According to several exemplary embodiments, the phenol-formaldehyde resin has a number average molecular weight from a low of about 200, about 300, or about 400 to a high of about 1,000, about 2,000, or about 6,000. For example, the phenol-formaldehyde resin can have a number average molecular weight from about 250 to about 450, about 450 to about 550, about 550 to about 950, about 950 to about 1,500, about 1,500 to about 3,500, or about 3,500 to about 6,000. The phenol-formaldehyde resin can also have a number average molecular weight of about 175 to about 800, about 700 to about 3,000, about 1,100 to about 2,200, about 230 to about 550, about 425 to about 875, or about 2,000 to about 2,750.

According to several exemplary embodiments, the phenol-formaldehyde resin has a z-average molecular weight from a low of about 200, about 300, or about 400 to a high of about 1,000, about 2,000, or about 9,000. For example, the phenol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. The phenol-formaldehyde resin can also have a z-average molecular weight of about 175 to about 800, about 700 to about 3,330, about 1,100 to about 4,200, about 230 to about 550, about 425 to about 875, or about 4,750 to about 8,500.

According to several exemplary embodiments, the phenol-formaldehyde resin has a polydispersity index from a low of about 1, about 1.75, or about 2.5 to a high of about 2.75, about 3.5, or about 4.5. For example, the phenol-formaldehyde resin can have a polydispersity index from about 1 to about 1.75, about 1.75 to about 2.5, about 2.5 to about 2.75, about 2.75 to about 3.25, about 3.25 to about 3.75, or about 3.75 to about 4.5. The phenol-formaldehyde resin can also have a polydispersity index of about 1 to about 1.5, about 1.5 to about 2.5, about 2.5 to about 3, about 3 to about 3.35, about 3.35 to about 3.9, or about 3.9 to about 4.5.

According to several exemplary embodiments, the phenol-formaldehyde resin has any suitable viscosity. The phenol-formaldehyde resin can be a solid or liquid at 25° C. For example, the viscosity of the phenol-formaldehyde resin can be from about 1 centipoise (cP), about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the phenol-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the phenol-formaldehyde resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the phenol-formaldehyde resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C. The viscosity of the phenol-formaldehyde resin can be determined using a Brookfield viscometer.

According to several exemplary embodiments, the phenol-formaldehyde resin can have pH from a low of about 1, about 2, about 3, about 4, about 5, about 6, about 7 to a high of about 8, about 9, about 10, about 11, about 12, or about 13. For example, the phenol-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

According to several exemplary embodiments of the present invention, the resin coating applied to the proppant particulates is an epoxy resin. According to such embodiments, the resin coating can include any suitable epoxy resin. For example, the epoxy resin can include bisphenol A, bisphenol F, aliphatic, or glycidylamine epoxy resins, and any mixtures or combinations thereof. An example of a commercially available epoxy resin is BE188 Epoxy Resin, available from Chang Chun Plastics Co., Ltd.

According to several exemplary embodiments, the epoxy resin can have any suitable viscosity. The epoxy resin can be a solid or liquid at 25° C. For example, the viscosity of the epoxy resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the epoxy resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the epoxy resin can have a viscosity from about 1 cP to about 45 cP, about 45 cP to about 125 cP, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the epoxy resin can also be from about 500 cP, about 1,000 cP, about 2,500 cP, about 5,000 cP, or about 7,000 cP to about 10,000 cP, about 12,500 cP, about 15,000 cP, about 17,000 cP, or about 20,000 cP at a temperature of about 25° C. In another example, the epoxy resin can have a viscosity from about 1,000 cP to about 12,000 cP, about 2,000 cP to about 11,000 cP, about 4,000 cP to about 10,500 cP, or about 7,500 cP to about 9,500 cP at a temperature of about 25° C. The viscosity of the epoxy resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the epoxy resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C.

According to several exemplary embodiments, the epoxy resin can have pH from a low of about 1, about 2, about 3, about 4, about 5, about 6, about 7 to a high of about 8, about 9, about 10, about 11, about 12, or about 13. For example, the epoxy resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

Methods for coating proppant particulates with resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

According to several exemplary embodiments of the present invention, a curing agent is applied to the resin-coated proppant particulates in order to accelerate the transition of the resin from a liquid to a solid state. Suitable curing agents include curing agents that will leave active amine or epoxy sites on the surface of the resin coating. Suitable curing agents will depend on the specific resin chemistry employed and can include amines, acids, acid anhydrides, and epoxies. In several exemplary embodiments of the present invention, a phenolic resin material is applied to the surface of the proppant particulates and cured with an amine curing agent in order to leave active amine sites on the resin coated surface of the proppant particulates. In several exemplary embodiments, the phenolic resin is cured with hexamethylenetetramine, also known as hexamine. An example of a commercially available hexamine is Hexion™; which is available from Momentive.

In one or more exemplary embodiments, the tracers are treated and/or coated with one or more chemicals or ligands to impart surface functionality to the tracer. These coatings can be selected from organic compound containing materials and/or organic compounds of varying chain lengths, each having functional groups on the terminus of their respective chains to modify or tailor the solubility (solubility, as used herein, also refers to a suspension or slurry) of the tracer and/or nanoparticle substrate in a produced fluid. Many commercially available surfactants can be used for this purpose. Ligands that are multi-functional can also be used as a coating, with one end of the ligand molecule binding to the tracer and/or nanoparticle substrate and the other end of the ligand molecule affecting the dispersibility of the functionalized nanoparticle in the desired organic or aqueous solvent or carrier fluid, as the tracer and/or nanoparticle substrate is not always completely "soluble" in the carrier fluid or production fluid. These multi-functional ligands can be modified by traditional organic synthetic methods and principles to increase or decrease solubility of the tracer and/or nanoparticle substrate in either organic or aqueous reservoir fluids, which can affect the useful lifetime of utilization of the tracer containing proppant. The property of the terminus groups on the multi-functional ligand molecule can also affect the solubility of the tracer and/or nanoparticle substrate in the fluid. The primary need for the added ligands to functionalize the tracer and/or nanoparticle substrate is to eventually affect the eventual leaching rate into the fluids. Examples of the types of functional groups that can be used are carboxylates, amines, thiols, polysiloxanes, silanes, alcohols, and other species capable of binding to the nanoparticle or the proppant surface.

The tracer containing proppant particulates can contain the tracers discussed above in any suitable amounts. For example, the coated porous proppant particulates, uncoated porous proppant particulates, coated non-porous proppant particulates and/or uncoated non-porous proppant particulates can contain the tracers in any suitable amounts. According to several exemplary embodiments, the tracers can be present in amounts from about 0.01 wt %, about 0.05 wt %, about 0.1 wt %, about 0.2 wt %, about 0.5 wt %, about 1 wt %, about 2 wt %, or about 3 wt % to about 5 wt %, about 8 wt %, or about 10 wt % or more based on the total weight of the tracer containing proppant particulates. For example, the tracer containing proppant can have a tracer concentration of about 0.2 wt % to about 12 wt %, about 0.7 wt % to about 10 wt %, about 1.5 wt % to about 9 wt %, or about 4 wt % to about 8 wt %.

According to certain embodiments described herein, the sintered, substantially round and spherical particulates are made in a continuous process, while in other embodiments; the particulates are made in a batch process.

Ceramic proppant can be manufactured to a range of apparent specific gravity. For example, U.S. Pat. No. 4,427, 068, the entire disclosure of which is incorporated herein by reference, discloses a method for manufacturing proppant with an apparent specific gravity of less than 3.4 $g/cm^3$. The method includes preparing proppant pellets from a clay mixture of at least 40% clay, and another material such as bauxite or alumina. The clay mixture includes burley clay, flint clay and at least 60% diaspore clay. The raw materials are blended in a mixer and water is added until the composite forms spherical pellets. 5-15% of additional ceramic powder is then added to the pellets. The spherical pellets are then dried and furnaced at sintering temperature until they reach an apparent specific gravity between about 2.7 and 3.4 $g/cm^3$.

Also, U.S. Pat. No. 4,440,866, the entire disclosure of which is incorporated herein by reference, discloses a method for continuous process manufacture of proppant with an apparent specific gravity of approximately 3.7 $g/cm^3$. The method includes 1) preparing an aqueous feed suspension of bauxite and a binder, 2) continuously atomizing the feed suspension into a layer of already partly dried bauxite particulates fluidized in a stream of drying air, 3) continuously recovering particulates from the layer, 4) continuously separating the particulates into oversize, undersize, and product fractions, 5) continuously recycling unsuitable material, and 6) drying and sintering the non-recycled product by heating at a temperature of between about 1200 and 1650° C.

In addition, U.S. Pat. No. 4,522,731, the entire disclosure of which is incorporated herein by reference, refers to the method disclosed in U.S. Pat. No. 4,440,866 to manufacture proppant having an apparent specific gravity of less than 3.0 $g/cm^3$.

Moreover, U.S. Pat. No. 4,623,630, the entire disclosure of which is incorporated herein by reference, discloses a method for manufacturing proppant with an apparent specific gravity of between about 2.6 to 3.3 $g/cm^3$. The method includes preparing proppant pellets from a mixture of dried but uncalcined or partially calcined clays and bauxites and dust collector fines with fully calcined materials. The raw materials are blended in a mixer and water is added until the composite forms spherical pellets. 5-15% of additional ceramic powder is then added to the pellets. The spherical pellets are then dried and furnaced at sintering temperature until they reach an apparent specific gravity between about 2.6 and 3.3 $g/cm^3$.

Further, U.S. Pat. No. 4,658,899, the entire disclosure of which is incorporated herein by reference, discloses a method for manufacturing proppant with an apparent specific gravity of between about 2.9 and 3.2 $g/cm^3$. The method includes preparing proppant pellets from a mixture of 40-70% dried but uncalcined clay, and bauxites and dust collector fines with fully calcined materials. The raw materials are blended in a mixer and water is added until the composite forms spherical pellets. 5-15% of additional ceramic powder is then added to the pellets. The spherical pellets are then dried and furnaced at sintering temperature until they reach an apparent specific gravity between about 2.9 to 3.2 $g/cm^3$.

Still further, U.S. Pat. No. 7,036,591, the entire disclosure of which is incorporated herein by reference, discloses that ceramic proppant can be manufactured to a range of apparent specific gravity. The range of apparent specific gravities reflects the range of internal porosity present in the ceramic pellets. According to certain embodiments of the present invention, the proppant composition has an apparent specific gravity of less than 3.1 $g/cm^3$, less than 3.0 $g/cm^3$, less than 2.8 $g/cm^3$, or less than 2.5 $g/cm^3$. In other embodiments, the proppant composition has an apparent specific gravity of from about 3.1 to 3.4 g/cm$^3$. In still other embodiments, the proppant composition has an apparent specific gravity of greater than 3.4 g/cm$^3$, greater than 3.6 g/cm$^3$, greater than 4.0 g/cm$^3$, or greater than 4.5 g/cm$^3$.

According to several exemplary embodiments, the proppant composition includes a porous ceramic proppant. Suitable proppant materials for use as the porous ceramic proppant include lightweight porous ceramic proppant, intermediate density porous ceramic proppant and high density porous ceramic proppant. U.S. Pat. No. 7,036,591, the entire disclosure of which is incorporated herein by reference, is directed to a proppant having a range of apparent specific gravity. According to several exemplary embodiments, the proppant composition can also include a non-porous proppant. Suitable materials for use as the non-porous particulate include lightweight non-porous ceramic proppant, intermediate density non-porous ceramic proppant and high density non-porous ceramic proppant.

Figure 2:
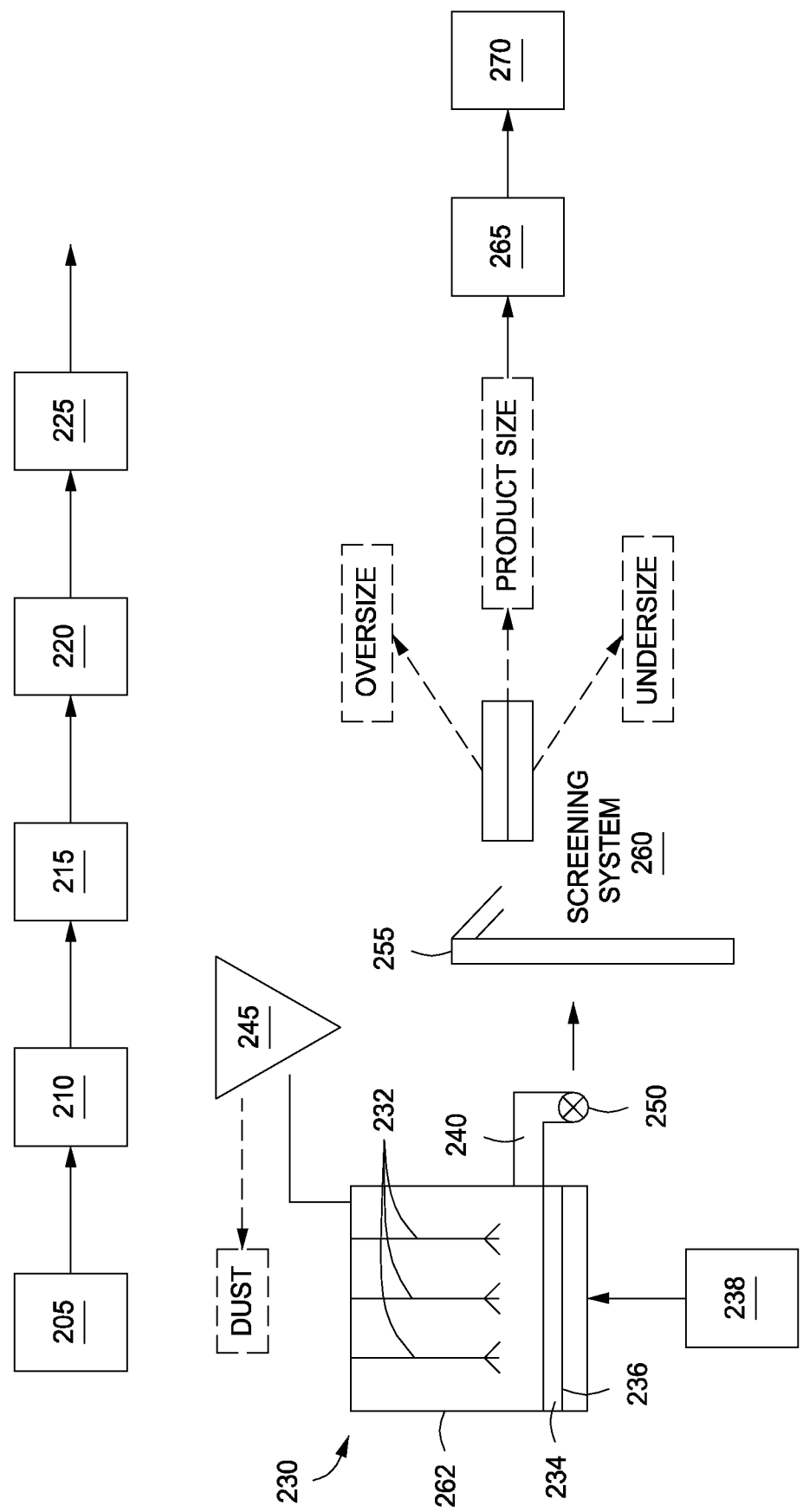
FIG. 2 is a schematic illustration of a system for preparing substantially round and spherical particulates from a slurry, according to several exemplary embodiments as described herein.

Referring now to FIG. 2, a system for implementing a continuous process for preparing sintered, substantially round and spherical particulates from a slurry is illustrated. The exemplary system illustrated in FIG. 2 is similar in configuration and operation to that described in U.S. Pat. No. 4,440,866, the entire disclosure of which is incorporated herein by reference.

In the system illustrated in FIG. 2, an alumina-containing raw material having an alumina content of from about 40% to about 55% by weight (on a calcined basis) is passed through a shredder 105 which slices and breaks apart the raw material into small chunks. In some embodiments, when the raw material as mined, or as received, (referred to herein as "untreated" raw material) is of such consistency that it can be processed as described herein without shredding, the shredder can be bypassed. Raw material fed through a shredder such as is illustrated in FIG. 2, is referred to as "treated" raw material.

In certain embodiments, the shredder breaks apart and slices the alumina-containing raw material so as to yield pieces having a diameter of less than about five inches, although pieces having smaller and larger diameters can be further processed into a slurry as described herein. Shredders and numerous other devices for slicing, chopping or comminuting the alumina-containing raw material, as well as commercial sources for same, such as the Gleason Foundry Company, are well known to those of ordinary skill in the art.

The treated or untreated alumina-containing raw material and water are fed to a blunger 110, which has a rotating blade that imparts a shear force to and further reduces the particulate size of the raw material to form a slurry. In a continuous process, the raw material and water are continuously fed to the blunger. Blungers and similar devices for making slurries of such materials, as well as commercial sources for same are well known to those of ordinary skill in the art.

A sufficient amount of water is added to the blunger 210 to result in a slurry having a solids content in the range of from about 40% to about 60% by weight. In certain embodiments, a sufficient amount of water is added to the slurry such that the solids content of the slurry is from about 45% to about 55% by weight. In still other embodiments, a sufficient amount of water is added to the slurry such that the solids content of the slurry is about 50% by weight. The water added to the blunger 210 can be fresh water or deionized water. In a continuous process for preparing the slurry, the solids content of the slurry is periodically analyzed and the amount of water fed to the slurry adjusted to maintain the desired solids content. Methods for analyzing the solids content of a slurry and adjusting a feed of water are well known and understood by those of ordinary skill in the art.

In certain embodiments, a dispersant is added to the slurry in the blunger 210 to adjust the viscosity of the slurry to a target range as discussed further below. In other embodiments, the viscosity of the slurry in the blunger 210 is adjusted to the target range by the addition of a dispersant and a pH-adjusting reagent.

Exemplary materials suitable for use as a dispersant in the compositions and methods described herein include but are not limited to sodium polyacrylate, ammonium polyacrylate, ammonium polymethacrylate, tetra sodium pyrophosphate, tetra potassium pyrophosphate, polyphosphate, ammonium polyphosphate, ammonium citrate, ferric ammonium citrate, and polyelectrolytes such as a composition of ammonium polymethacrylate and water commercially available from a variety of sources, such as, Kemira Chemicals under the trade name C-211, Phoenix Chemicals, Bulk Chemical Systems under the trade name BCS 4020 and R.T. Vanderbilt Company, Inc. under the trade name DARVAN C. Generally, the dispersant can be any material that will adjust the viscosity of the slurry to a target viscosity such that the slurry can be subsequently processed through one or more pressure nozzles of a fluidizer. In certain embodiments, the target viscosity is less than 150 centipoise (cP) (as determined on a Brookfield Viscometer with a #61 spindle). In other embodiments, the target viscosity is less than 100 cP.

According to embodiments in which a pH-adjusting reagent is used, a sufficient amount of a pH-adjusting reagent is added to the slurry to adjust the pH of the slurry to a range of from about 8 to about 11. In certain embodiments, a sufficient amount of the pH-adjusting reagent is added to the slurry to adjust the pH to about 9, about 9.5, about 10 or about 10.5. The pH of the slurry can be periodically analyzed by a pH meter, and the amount of pH-adjusting reagent fed to the slurry adjusted to maintain a desired pH. Methods for analyzing the pH of a slurry and adjusting the feed of the pH-adjusting reagent are within the ability of those of ordinary skill in the art. Exemplary materials suitable for use as a pH-adjusting reagent in the compositions and methods described herein include but are not limited to ammonia and sodium carbonate.

Generally, the target viscosity of the compositions is a viscosity that can be processed through a given type and size of pressure nozzle in a fluidizer, without becoming clogged. Generally, the lower the viscosity of the slurry, the more easily it can be processed through a given fluidizer. However, the addition of too much dispersant can cause the viscosity of the slurry to increase to a point that it cannot be satisfactorily processed through a given fluidizer. One of ordinary skill in the art can determine the target viscosity for given fluidizer types through routine experimentation.

The blunger 210 mixes the alumina-containing raw material, water, dispersant and pH-adjusting reagent until a slurry is formed. The length of time required to form a slurry is dependent on factors such as the size of the blunger, the speed at which the blunger is operating, and the amount of material in the blunger.

From the blunger 210, the slurry is fed to a tank 215, where the slurry is continuously stirred, and a binder is added in an amount of from about 0.2% to about 5.0% by weight, based on the total dry weight of the alumina-containing raw material. In certain embodiments, the binder is added in an amount of from about 0.2% to about 3.0% by weight based on the total dry weight of the alumina-containing raw material. Suitable binders include but are not limited to polyvinyl acetate, polyvinyl alcohol (PVA), methylcellulose, dextrin and molasses. In certain embodiments, the binder is PVA having a molecular weight of from about 20,000 to 100,000 Mn. "Mn" represents the number average molecular weight which is the total weight of the polymeric molecules in a sample, divided by the total number of polymeric molecules in that sample.

The tank 215 maintains the slurry created by the blunger 210. However, the tank 215 stirs the slurry with less agitation than the blunger, so as to mix the binder with the slurry without causing excessive foaming of the slurry or increasing the viscosity of the slurry to an extent that would prevent the slurry from being fed through the pressurized nozzles of a fluidizer.

In another embodiment, the binder can be added to the slurry while in the blunger. In this embodiment, the blunger optionally has variable speeds, including a high speed to achieve the high intensity mixing for breaking down the raw material into a slurry form, and a low speed to mix the binder with the slurry without causing the above-mentioned excessive foaming or increase in viscosity.

Referring again to the tank 215 illustrated in FIG. 2, the slurry is stirred in the tank, after addition of the binder, for a time sufficient to thoroughly mix the binder with the slurry. In certain embodiments, the slurry is stirred in the tank for up to about 30 minutes following the addition of binder. In other embodiments, the slurry is stirred in the tank 215 for at least about 30 minutes. In still other embodiments, the slurry is stirred in the tank for more than about 30 minutes after addition of the binder.

Tank 215 can also be a tank system comprised of one, two, three or more tanks. Any configuration or number of tanks that enables the thorough mixing of the binder with the slurry is sufficient. In a continuous process, water, and one or more of dust, oversize particulates, or undersize particulates from a subsequent fluidizer or other apparatus can be added to the slurry in the tank 215.

From the tank 215, the slurry is fed to a heat exchanger 220, which heats the slurry to a temperature of from about 25° C. to about 90° C. From the heat exchanger 220, the slurry is fed to a pump system 225, which feeds the slurry, under pressure, to a fluidizer 230.

A grinding mill(s) and/or a screening system(s) (not illustrated) can be inserted at one or more places in the system illustrated in FIG. 2 prior to feeding the slurry to the fluidizer to assist in breaking any larger-sized alumina-containing raw material down to a target size suitable for feeding to the fluidizer. In certain embodiments, the target size is less than 230 mesh. In other embodiments, the target size is less than 325 mesh, less than 270 mesh, less than 200 mesh or less than 170 mesh. The target size is influenced by the ability of the type and/or size of the pressure nozzle in the subsequent fluidizer to atomize the slurry without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particulates larger than the target size from the slurry. For example, the screening system can include one or more screens, which are selected and positioned so as to screen the slurry to particulates that are smaller than the target size.

Referring again to FIG. 2, fluidizer 230 is of conventional design, such as described in, for example, U.S. Pat. No. 3,533,829 and U.K. Patent No. 1,401,303. Fluidizer 230 includes at least one atomizing nozzle 232 (three atomizing nozzles 232 being shown in FIG. 2), which is a pressure nozzle of conventional design. In other embodiments, one or more two-fluid nozzles are suitable. The design of such nozzles is well known, for example from K. Masters: "Spray Drying Handbook", John Wiley and Sons, New York (1979).

Fluidizer 230 further includes a particulate bed 234, which is supported by a plate 236, such as a perforated, straight or directional plate. Hot air flows through the plate 236. The particulate bed 234 includes seeds from which green pellets of a target size can be grown. The term "green pellets" and related forms, as used herein, refers to substantially round and spherical particulates which have been formed from the slurry but are not sintered. When a perforated or straight plate is used, the seeds also serve to obtain plug flow in the fluidizer. Plug flow is a term known to those of ordinary skill in the art, and can generally be described as a flow pattern where very little back mixing occurs. The seed particulates are smaller than the target size for green pellets made according to the present methods. In certain embodiments, the seed includes from about 5% to about 20% of the total volume of a green pellet formed therefrom. Slurry is sprayed, under pressure, through the atomizing nozzles 232, and the slurry spray coats the seeds to form green pellets that are substantially round and spherical.

External seeds can be placed on the perforated plate 236 before atomization of the slurry by the fluidizer begins. If external seeds are used, the seeds can be prepared in a slurry process similar to that illustrated in FIG. 2, where the seeds are simply taken from the fluidizer at a target seed size. External seeds can also be prepared in a high intensity mixing process such as that described in U.S. Pat. No. 4,879,181, the entire disclosure of which is hereby incorporated by reference.

According to certain embodiments, external seeds are made from either a raw material having at least the same alumina content as the raw material used to make the slurry, or from a raw material having more or less alumina than the raw material used to make the slurry. In certain embodiments, the slurry has an alumina content that is at least 10%, at least 20%, or at least 30% less than that of the seeds. In other embodiments, the external seeds have an alumina content less than that of the slurry, such as at least 10%, at least 20%, or at least 30% less than that of the slurry.

Alternatively, seeds for the particulate bed are formed by the atomization of the slurry, thereby providing a method by which the slurry "self-germinates" with its own seed. According to one such embodiment, the slurry is fed through the fluidizer 230 in the absence of a seeded particulate bed 234. The slurry droplets exiting the nozzles 232 solidify, but are small enough initially that they get carried out of the fluidizer 230 by air flow and caught as "dust" (fine particulates) by a dust collector 245, which may, for instance, be an electrostatic precipitator, a cyclone, a bag filter, a wet scrubber or a combination thereof. The dust from the dust collector is then fed to the particulate bed 234 through dust inlet 262, where it is sprayed with slurry exiting the nozzles 232. The dust can be recycled a sufficient number of times, until it has grown to a point where it is too large to be carried out by the air flow and can serve as seed. The dust can also be recycled to another operation in the process, for example, the tank 215.

Referring again to FIG. 2, hot air is introduced to the fluidizer 230 by means of a fan and an air heater, which are schematically represented at 238. The velocity of the hot air passing through the particulate bed 234 is from about 0.9 meters/second to about 1.5 meters/second, and the depth of the particulate bed 234 is from about 2 centimeters to about 60 centimeters. The temperature of the hot air when introduced to the fluidizer 230 is from about 250° C. to about 650° C. The temperature of the hot air as it exits from the fluidizer 230 is less than about 250° C., and in some embodiments is less than about 100° C.

The distance between the atomizing nozzles 232 and the plate 236 is optimized to avoid the formation of dust which occurs when the nozzles 232 are too far away from the plate 226 and the formation of irregular, coarse particulates which occurs when the nozzles 232 are too close to the plate 236. The position of the nozzles 232 with respect to the plate 236 is adjusted on the basis of an analysis of powder sampled from the fluidizer 230.

The green pellets formed by the fluidizer accumulate in the particulate bed 234. In a continuous process, the green pellets formed by the fluidizer 230 are withdrawn through an outlet 240 in response to the level of product in the particulate bed 234 in the fluidizer 230, so as to maintain a given depth in the particulate bed. A rotary valve 250 conducts green pellets withdrawn from the fluidizer 230 to an elevator 255, which feeds the green pellets to a screening system 260, where the green pellets are separated into one or more fractions, for example, an oversize fraction, a product fraction, and an undersize fraction.

The oversize fraction exiting the screening unit 260 includes those green pellets that are larger than the desired product size. In a continuous process, the oversize green pellets can be recycled to tank 215, where at least some of the oversize green pellets can be broken down and blended with slurry in the tank. Alternatively, oversize green pellets can be broken down and recycled to the particulate bed 234 in the fluidizer 230. The undersize fraction exiting the screening system 260 includes those green pellets that are smaller than the desired product size. In a continuous process, these green pellets can be recycled to the fluidizer 230, where they can be fed through an inlet 262 as seeds or as a secondary feed to the fluidizer 230.

The product fraction exiting the screening system 260 includes those green pellets having the desired product size. These green pellets are sent to a pre-sintering device 265, for example, a calciner, where the green pellets are dried or calcined prior to sintering. In certain embodiments, the green pellets are dried to a moisture content of less than about 18% by weight, or less than about 15% by weight, about 12% by weight, about 10% by weight, about 5% by weight, or about 1% by weight.

After drying and/or calcining, the green pellets are fed to a sintering device 270, in which the green pellets are sintered for a period of time sufficient to enable recovery of sintered, substantially round and spherical particulates having one or more of a desired apparent specific gravity, bulk density, and crush strength. Alternatively, the pre-sintering device 265 can eliminated if the sintering device 270 can provide sufficient calcining and/or drying conditions (i.e., drying times and temperatures that dry the green pellets to a target moisture content prior to sintering), followed by sufficient sintering conditions.

The specific time and temperature to be employed for sintering is dependent on the starting ingredients and the desired density for the sintered particulates. In some embodiments, sintering device 270 is a rotary kiln, operating at a temperature of from about 1000° C. to about 1600° C., for a period of time from about 5 to about 90 minutes. In certain embodiments, a rotary kiln is operated at a temperature of about 1000° C., about 1200° C., about 1300° C., about 1400° C. or about 1500° C. In certain embodiments, the green pellets have a residence time in the sintering device of from about 50 minutes to about 70 minutes, or from about 30 minutes to about 45 minutes. After the particulates exit the sintering device 270, they can be further screened for size, and tested for quality control purposes. Inert atmosphere sintering can be used and techniques for replacing the oxygen rich atmosphere in the sintering device with an inert gas such as argon, nitrogen, or helium are well known to those of ordinary skill in the art. Generally, oxygen is replaced with an inert gas such that 0.005% oxygen or less remains in the sintering atmosphere.

Light weight ceramic proppant, intermediate density ceramic proppant, and high density ceramic proppant, having a suitable porosity, can be removed and/or withdrawn from the sintering device 270.

Figure 3:
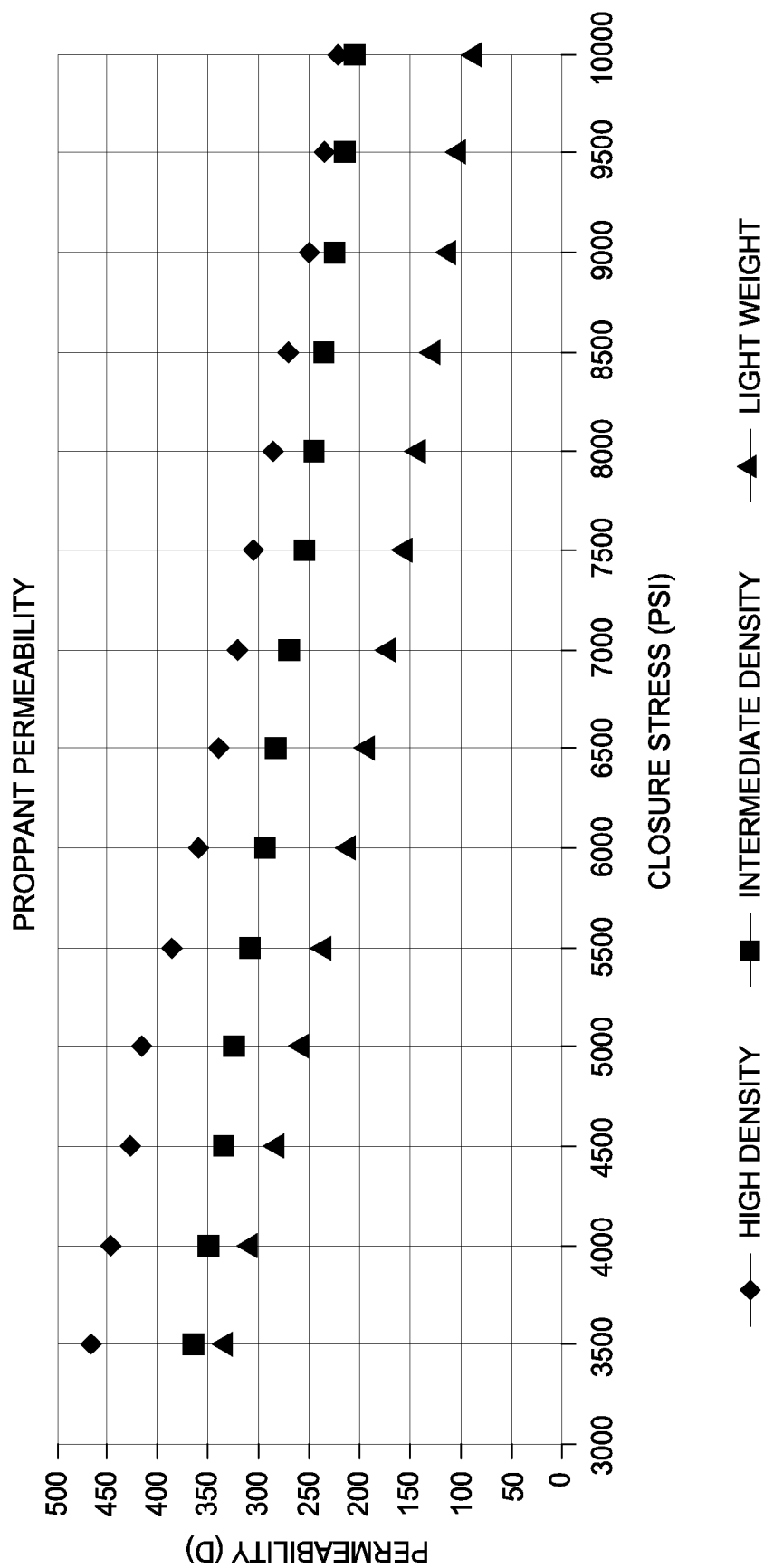
FIG. 3 is a graphical representation of a comparison of proppant permeability for lightweight ceramic proppant, intermediate density ceramic proppant, and high density ceramic proppant.
Figure 4:
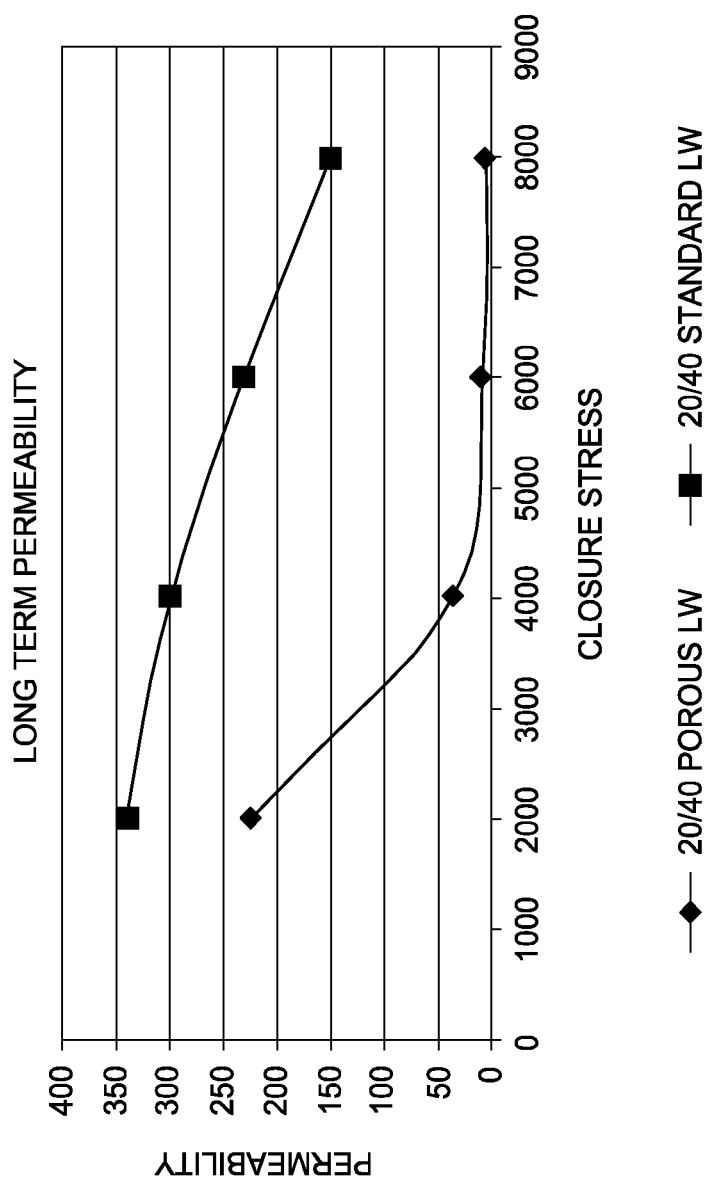
FIG. 4 is a graphical representation of the long term permeability of a standard non-porous light weight ceramic proppant and a light weight porous ceramic proppant (at 25% porosity).

FIG. 3 is a graphical comparison of the permeability of light weight ceramic proppant, intermediate density ceramic proppant, and high density ceramic proppant. As shown in FIG. 3, a high density ceramic proppant has a higher permeability than an intermediate density ceramic proppant which in turn has a higher permeability than a light weight ceramic proppant. This variability results from the crystalline structure differences arising from the difference in composition of the starting raw materials. FIG. 4 is a graphical representation of the long term permeability of a standard non-porous light weight ceramic proppant and a light weight porous ceramic proppant (at 25% porosity). Standard ceramic proppant are generally manufactured so as to eliminate as much porosity as is practically possible in the individual particulates in order to maximize the inherent strength of the particulates. This is consistent with the nature of ceramic bodies in that they tend to fail as a function of the size of the largest internal flaw and in this context an internal open pore space is a flaw. Consequently, in a general sense, the lower the internal porosity with small pore sizes, the stronger the ceramic body. Conversely, in a general sense, the greater the overall amount of internal porosity and large pore size of a ceramic particulate the weaker will be its inherent strength. Thus, the conductivity of a light weight ceramic proppant in which there is 10% porosity in the particulate will be lower than the conductivity of a light-weight ceramic proppant having 5% porosity which in turn will be lower than a non-porous light weight ceramic proppant.

Further, the comparison shown in FIG. 3 for non-porous ceramic proppant can be duplicated for porous ceramic proppant. Specifically, a high density porous ceramic proppant that has a porosity of the particulate of 12% will have a higher permeability than an intermediate density ceramic proppant with 12% particulate porosity, which in turn will have a higher permeability than a light weight ceramic proppant with 12% particulate porosity.

According to several exemplary embodiments, the porous ceramic proppant is infused with one or more chemical treatment agents such as the tracers disclosed herein. Methods for infusing porous ceramic particulates with chemical treatment agents are well known to those of ordinary skill in the art, such as those disclosed in U.S. Pat. Nos. 5,964,291 and 7,598,209, the entire disclosures of which are incorporated herein by reference. According to several exemplary embodiments, the porous ceramic proppant act as a carrier for the tracer in a hydraulic fracturing operation. The tracers can be homogeneously or at least substantially homogeneously distributed throughout the pores and/or interstitial spaces of the porous ceramic proppant. The tracers can be infused into the pores and/or interstitial spaces of the porous ceramic proppant by means of or under the presence of microwave energy, such as in a microwave furnace.

According to several exemplary embodiments of the present invention, in order to add porous, tracer-infused ceramic proppant to standard non-porous ceramic proppant in a hydraulic fracture in a way that does not impair the permeability or conductivity of the standard non-porous ceramic proppant alone, requires the use of a combination of different types of ceramic proppant for the standard non-porous and porous portions of the total ceramic proppant mass utilized in the fracturing operation. For instance, according to several exemplary embodiments of the present invention, if the standard non-porous particulate selected is a light weight ceramic proppant, the porous ceramic particulate can be either an intermediate density ceramic proppant or a high density ceramic proppant. Also, according to several exemplary embodiments of the present invention, if the standard non-porous particulate selected is an intermediate density proppant, the porous ceramic particulate can be a high density ceramic proppant.

For example, the fraction of intermediate density porous ceramic proppant to be added to a standard non-porous lightweight ceramic proppant will dictate the maximum porosity that the intermediate density porous ceramic can have and not negatively impact permeability. In this example, if a 10% fraction of intermediate density porous proppant is to be added to a standard light weight ceramic proppant then the maximum porosity of the intermediate density porous proppant can be 12% in order to not reduce the permeability of the proppant as compared to the permeability of the standard light weight ceramic proppant alone whereas adding a 10% fraction of an intermediate density porous proppant having 20% porosity can be detrimental to proppant permeability.

According to several exemplary embodiments of the present invention, the porous, tracer-infused ceramic proppant can have a similar alumina content as the standard non-porous ceramic proppant and can be added to the standard non-porous ceramic proppant in a hydraulic fracture in a way that does not impair the permeability or conductivity of the standard non-porous ceramic proppant alone. According to such embodiments, the porous and non-porous proppant are processed in different ways such that the mechanical properties of the tracer containing porous ceramic proppant is approximately the same as or better that the mechanical properties of the standard non-porous ceramic proppant.

According to several exemplary embodiments, the tracer containing coated porous ceramic proppant can be prepared according to a two-step process. In the first step, a tracer, having the nanoparticle substrate and the dopant, is infused into the porous ceramic proppant. In the second step, the infused porous ceramic proppant is coated with a semi-permeable substantially non-degradable polymer. In several exemplary embodiments, the tracer can be infused into the porous ceramic proppant by vacuum infusion. In other exemplary embodiments, the tracer can be infused into the porous ceramic proppant using a thermal infusion process whereby the porous ceramic proppant is heated and wetted with a solution containing the tracer. As the porous ceramic proppant cools, capillary action causes the tracer to infuse into the porous ceramic proppant.

According to several exemplary embodiments, the tracer containing coated porous ceramic proppant can be prepared according to a one step process. According to the one step process, the porous ceramic proppant are infused with the tracer(s) using the thermal infusion process described above and coated with a semi-permeable substantially non-degradable polymer before the resultant heat from the thermal infusion process dissipates.

According to several exemplary embodiments, a composite ceramic proppant composition for use in hydraulic fracturing is produced. According to several exemplary embodiments, the composite ceramic proppant composition includes porous ceramic proppant infused with a tracer without the use of a solvent. Furthermore, according to several exemplary embodiments, the infused porous ceramic proppant is coated with a semi-permeable substantially non-degradable polymer.

According to several exemplary embodiments, the tracer is infused into the porous ceramic proppant without the use of a solvent or solvent carrier. The carrier containing the tracer can include a liquid, such as an aqueous solution, or a solid, such as a wax or polymeric composition. The carrier can also include a solid such as a wax or a polymeric composition. The tracer can be infused into the porous ceramic proppant by melting, thawing, heating, softening, or warming the carrier containing the tracer to a sufficiently low viscosity to allow infusion into the porous ceramic proppant. In several exemplary embodiments, a sufficiently low viscosity to allow infusion into the porous ceramic proppant is from about 1000 to about 10,000 centipoise (cP), from about 1000 to about 5,000 cP, or from about 1000 to about 2500 cP.

According to several exemplary embodiments, after a composition containing the tracer is melted to a sufficiently low viscosity to allow infusion into the porous ceramic proppant, the melted composition containing the tracer is infused into the porous ceramic proppant using the infusion methods described above.

A ceramic proppant composition containing a mixture of porous ceramic proppant and non-porous ceramic proppant can have a conductivity that is at least about 10%, at least about 20%, at least about 30%, at least about 40%, at least about 50%, at least about 60%, at least about 70%, at least about 80%, at least about 90%, at least about 95%, or at least about 99% of the conductivity of the non-porous ceramic proppant. For example, the ceramic proppant composition containing a mixture of porous ceramic proppant and non-porous ceramic proppant can have a conductivity from about 25% to about 125%, about 55% to about 115%, about 65% to about 112%, about 75% to about 108%, about 85% to about 105%, about 95% to about 105%, or about 99.99% to about 102% of the conductivity of the non-porous ceramic proppant.

In addition to determining which stages of a hydraulically fractured well are producing hydrocarbons and/or water it may be desirable to determine the fraction of the created fracture that is contributing to the flow of fluids. Estimates of the length and heights of the created fracture are possible by various means well known to those of ordinary skill in the art. Fracture lengths of several hundred feet and heights of 50 feet or more are common. Further it is also well established that the entire length and height of the created fracture may not contribute to production from the well. This lack of contribution can be determined by a number of methods well known to those of ordinary skill in the art. To the extent the entire fracture does not contribute to flow, the cost to create the non-contributing portion is wasted or conversely failure of a portion of the fracture to contribute may result in a reduction of produced hydrocarbons from the well. Thus, it is valuable to assess the fraction of the created fracture contributing to flow. Such knowledge can lead to optimization of the design of subsequent hydraulic fracturing operations. This can be accomplished by incorporating a proppant containing a unique water and/or hydrocarbon partitioning tracer within a segment of the proppant being pumped in a particular stage and then incorporating a proppant containing a different unique water and/or hydrocarbon partitioning tracer within a second a segment of the proppant being pumped in the same stage. This method can be replicated for as many segments of the stage one desires to interrogate. In the case of a 40 stage hydraulic fracturing operation where it is desirable to determine the contribution of both hydrocarbons and water from each stage as well as the hydrocarbon and water contribution from 5 segments of each stage, then 400 unique tracers are required.

According to several exemplary embodiments, when the well is placed on production following the completion of the hydraulic fracturing operations, the infused tracer will elute from the porous ceramic grains of the porous proppant and/or from the coating of the coated proppant and will partition into one or both of the produced hydrocarbons and water. Samples of the produced water and hydrocarbons are then captured at different points in time and analyzed for the presence of the unique tracers. By identifying the presence and relative concentration of each of the tracers, diagnostic determinations can be made of the effectiveness of the stimulation and the hydrocarbon or water productivity of the stimulated formation. This diagnostic information can then be utilized to optimize subsequent hydraulic fracturing operations in nearby wells.

In order to accomplish this, and according to several exemplary embodiments, the tracer separates from the tracer containing proppant after the tracer containing proppant is injected into the fracture. In several exemplary embodiments, separation of the tracer from the tracer containing proppant can be accomplished by the tracer leaching, eluting, diffusing, bleeding, discharging, draining, seeping, or leaking out of the porous proppant and/or the coated proppant, or any combination thereof. Further, this leaching, eluting, diffusing, bleeding, discharging, draining, seeping, or leaking out of the porous proppant and/or the coated proppant, or any combination thereof can be further controlled by a permeable, semi-permeable, and/or degradable coating. According to several exemplary embodiments, the porous ceramic proppant infused with a tracer are coated with a polymeric material that forms a semi-permeable polymeric coating that is substantially non-degradable in the presence of the well fluids but permits the tracer to leach, elute, diffuse, bleed, discharge, desorb, dissolve, drain, seep, and leak through the polymeric coating so as to release the tracer into the fracture or well area. According to several exemplary embodiments, the coated, tracer containing proppant is coated with a polymeric material that forms a semi-permeable polymeric coating that is substantially non-degradable in the presence of the well fluids but permits the tracer to leach, elute, diffuse, bleed, discharge, desorb, dissolve, drain, seep, and leak through the polymeric coating so as to release the tracer into the fracture or well area. The amount and molecular weight of the semi-permeable substantially non-degradable polymeric coating can be varied to provide for longer or shorter release times for tailored release of the tracers. According to several exemplary embodiments, the porous proppant and the coated, tracer containing proppant are coated with a semi-permeable substantially non-degradable polymer such as phenol formaldehyde, polyurethane, cellulose ester, polyamides, vinyl esters, epoxies, or combinations thereof.

The tracer contained in the coatings of the coated proppant and/or contained in the infused coated porous proppant can leach, elute, diffuse, bleed, discharge, desorb, dissolve, drain, seep, or leak from the tracer containing proppant once the tracer containing proppant in the subterranean fracture is in contact with an aqueous and/or hydrocarbon solution. According to such embodiments, the infused coated porous ceramic proppant and/or tracer containing coated proppant is placed in a fracture in a subterranean formation and once hydrocarbon production begins, the presence of the hydrocarbons causes leaching, elution, diffusion, bleeding, discharging, desorbing, dissolving, draining, seeping, or leaking of the tracer contained in a hydrocarbon-soluble coating from the proppant. After a certain period of time, when water production begins, then the tracer contained in the water-soluble coating begins to leach, elute, diffuse, bleed, discharge, desorb, dissolve, drain, seep, or leak from the proppant.

According to several exemplary embodiments of the present invention, the tracer containing proppant particulates include a degradable coating. Specifically, as the coating degrades, the tracer contained within the coating, under the coating, and/or within pores of the proppant particulates will be released into the fracture fluid. The amount and molecular weight of the degradable coating can be varied to provide for longer or shorter degrade times and tailored release of the tracer. According to several exemplary embodiments, the tracer is released from the tracer containing proppant for a period of up to about one year, up to about five years, or up to about ten years after the tracer containing proppant are placed in a fracture in a subterranean formation.

According to certain embodiments, the degradable coating can include one or more of water-soluble polymers and cross-linkable water-soluble polymers. Suitable water-soluble polymers and cross-linkable water-soluble polymers are disclosed in U.S. Pat. No. 6,279,656, the entire disclosure of which is incorporated herein by reference. According to several exemplary embodiments in which the degradable coating includes one or more of water-soluble polymers and cross-linkable water-soluble polymers, the solubility parameters of such polymers can be controlled to adjust the timing of the solubility or degradation of the coating. Such parameters can include molecular weight, the hydrophilic/lipophilic balance of the polymers, and the extent of cross-linking of the polymers. According to several exemplary embodiments, the degradable coating includes a degradable polymer such as polylactic acid, cellulose acetate, methyl cellulose or combinations thereof and will degrade inside the hydraulic fracture to allow for the release of the tracer at different time intervals.

The tracer can leach, elute, diffuse, bleed, discharge, desorb, dissolve, drain, seep, or leak from the tracer containing proppant particulates at any suitable rate. According to one or more exemplary embodiments, the tracer can leach, elute, diffuse, bleed, discharge, desorb, dissolve, drain, seep, or leak from the tracer containing proppant particulates at a rate of at least about 0.1 ppm/(gram*day), at least about 0.3 ppm/(gram*day), at least about 0.7 ppm/(gram*day), at least about 1.25 ppm/(gram*day), at least about 2 ppm/(gram*day), at least about 3 ppm/(gram*day), at least about 4 ppm/(gram*day), at least about 6 ppm/(gram*day), or at least about 8 ppm/(gram*day) for at least about 2 months, at least about 6 months, at least about 9 months, at least about 1 year, or at least about 2 years. For example, tracers can elute from the tracer containing proppant particulates at a rate from about 0.01 ppm/(gram*day), about 0.05 ppm/(gram*day), about 0.1 ppm/(gram*day), about 0.5 ppm/(gram*day), about 1 ppm/(gram*day), about 1.5 ppm/(gram*day), about 2 ppm/(gram*day), or about 3 ppm/(gram*day) to about 4 ppm/(gram*day), about 4.5 ppm/(gram*day), about 5 ppm/(gram*day), about 6 ppm/(gram*day), about 7 ppm/(gram*day), about 8 ppm/(gram*day), about 10 ppm/(gram*day), about 15 ppm/(gram*day), about 30 ppm/(gram*day), or about 75 ppm/(gram*day) for at least about 2 months, at least about 6 months, at least about 9 months, at least about 1 year, or at least about 2 years.

As mentioned above, the partitioning of the tracer, i.e., whether into the hydrocarbon or water phase, can be tailored based on the needs of the fracturing operation by tailoring the encapsulation material and/or coating material. If, for example, diagnostic information is needed about a hydrocarbon-producing section of the well, a porous ceramic proppant can be infused with an encapsulated hydrocarbon-partitioning tracer, which will then separate from the porous ceramic proppant into the surrounding hydrocarbon fluids. Conversely, if diagnostic information is needed about a water-producing section of the well, a porous ceramic proppant can be infused with an encapsulated water-partitioning tracer, which will then separate from the porous ceramic proppant into the water.

According to several exemplary embodiments, a method of diagnostic evaluation of a hydraulic fracturing operation is provided, the method including: 1) injecting a hydraulic fluid into the subterranean formation at a rate and pressure sufficient to open a fracture therein, and 2) injecting a proppant composition into the subterranean formation, wherein the proppant composition includes proppant particulates containing tracers, 3) wherein the tracers separate from the proppant particulates over an extended period of time, 4) wherein the tracers return to the surface with the produced fluids, and 5) wherein the tracers are recovered and identified.

As noted above, ceramic proppant can be manufactured to a range of apparent specific gravities and such range of specific gravities reflects the range of internal porosity present in the ceramic pellets. Typically, the internal porosity of commercial ceramic proppant is low (generally less than 5% and this internal porosity is not interconnected). As disclosed in U.S. Pat. No. 7,036,591, however, the processing of ceramic proppant can be altered to generate within the individual ceramic pellet a porosity exceeding 30%. As pellet porosity exceeds about 5%, the porosity of the pellet becomes interconnected. According to several exemplary embodiments, the internal interconnected porosity in the porous ceramic proppant can be infused with a tracer.

According to several exemplary embodiments, the porous ceramic proppant can have any suitable porosity. The porous ceramic proppant can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the porous ceramic proppant is from about 5 to about 75%, about 5 to about 15%, about 15 to about 35%, about 25% to about 45%, about 30% to about 55%, or about 35% to about 70%. According to several exemplary embodiments, the porous ceramic proppant can have any suitable average pore size. For example, the porous ceramic proppant can have an average pore size from about 55 nm, about 110 nm, about 520 nm, or about 1,100 to about 2,200 nm, about 5,500 nm, about 11,000 nm, about 17,000 nm, or about 25,000 nm or more in its largest dimension. For example, the porous ceramic proppant can have an average pore size can be from about 3 nm to about 30,000 nm, about 30 nm to about 18,000 nm, about 200 nm to about 9,000, about 350 nm to about 4,500 nm, or about 850 nm to about 1,800 nm in its largest dimension.

According to several exemplary embodiments, in order to ensure the tracer is reliably carried to the surface in produced fluid from the porous ceramic proppant, the tracer is soluble or dispersible in the produced fluid. The produced fluid can be water or hydrocarbon and there are available tracers that are only soluble in water or only soluble in liquid hydrocarbon or only soluble in hydrocarbon gases. This variable solubility allows for more definitive diagnostic capabilities. For example hydraulic fracturing is often performed in stages. That is, the entire hydrocarbon bearing interval to be hydraulically fractured is not stimulated at one time but rather in stages. In the case of a horizontal well, as many as forty separate hydraulic fracturing operations, or stages, can be conducted in the horizontal section. Because each stage of hydraulic fracturing entails additional cost, it is of interest to determine how many of the stages are contributing to production from the well and further which contributing stages are producing hydrocarbons and which are producing water. The use of distinctive tracers can accomplish this objective. For example, if a well is hydraulically fractured in five stages and it is of diagnostic importance to determine which of the stages are producing liquid hydrocarbons and which of the stages are producing water, then there can be introduced into the proppant for stage 1 a fraction of the proppant having a unique liquid hydrocarbon-soluble Tracer 1H contained in the coated and/or infused into the pores thereof. Also, there can be added to this stage, a fraction of the proppant having a unique water-soluble Tracer 1W. For the second stage of the hydraulic fracturing operation, then there can be introduced into the proppant for stage 2 a fraction of the proppant that has a unique liquid hydrocarbon soluble Tracer 2H contained in the coated and/or infused into the pores thereof. Also, there can be added to this stage a fraction of the proppant that has a unique water-soluble Tracer 2W. This method of adding uniquely distinguishable hydrocarbon-soluble and water-soluble tracers can continue for all or a portion of the subsequent stages. When the well is then placed on production following the completion of the hydraulic fracturing operations, samples of the produced water and hydrocarbons can then be captured at different points in time following the start of production and analyzed for the presence of the unique tracers. By determining the presence and relative concentration of each of the tracers, diagnostic determinations can be made of the effectiveness of the stimulation and the hydrocarbon content of the stimulated formation. This diagnostic information can then be utilized to optimize subsequent hydraulic fracturing operations in nearby wells.

In an exemplary method of fracturing a subterranean formation, a hydraulic fluid is injected into the formation at a rate and pressure sufficient to open a fracture therein, and a fluid containing a proppant composition including a tracer containing proppant, as described herein and having one or more of the properties as described herein is injected into the fracture to prop the fracture in an open condition. In another exemplary method of fracturing a subterranean formation, a hydraulic fluid is injected into the formation at a rate and pressure sufficient to open a fracture therein, and a fluid containing a proppant composition including a non-porous particulate and a porous ceramic particulate infused with a tracer, as described herein and having one or more of the properties as described herein is injected into the fracture to prop the fracture in an open condition. According to several exemplary embodiments, a method of fracturing a subterranean formation includes injecting a hydraulic fluid into the subterranean formation at a rate and pressure sufficient to open a fracture therein, and a fluid containing a proppant composition including tracer containing proppant that is coated with a semi-permeable substantially non-degradable polymer, as described herein and having one or more of the properties as described herein is injected into the fracture to prop the fracture in an open condition. Also according to several exemplary embodiments, a method of fracturing a subterranean formation includes injecting a hydraulic fluid into the subterranean formation at a rate and pressure sufficient to open a fracture therein, and a fluid containing a proppant composition including porous ceramic particulates infused with a tracer and coated with a semi-permeable substantially non-degradable polymer, as described herein and having one or more of the properties as described herein is injected into the fracture to prop the fracture in an open condition.

Exemplary embodiments of the present disclosure further relate to any one or more of the following subparagraphs:

1. A proppant composition for use in hydraulic fracturing, the composition including a plurality of proppant particulates; and at least one particulate of the plurality of proppant particulates containing at least one tracer; wherein the at least one tracer separates from the at least one particulate located inside a fracture of a subterranean formation after a period of time.

2. The composition according to subparagraph 1, wherein the at least one particulate has a long term permeability measured in accordance with ISO 13503-5 at 7,500 psi of at least about 10 Darcies.

3. The composition according to subparagraphs 1 or 2, wherein the at least one tracer separates from the at least one particulate located inside the fracture at a known rate.

4. The composition according to any one of subparagraphs 1 to 3, wherein the plurality of proppant particulates comprises non-porous particulates and porous particulates.

5. The composition according to subparagraph 4, wherein the composition has a permeability that is at least equal to the permeability of the non-porous particulates.

6. The composition according to subparagraphs 4 or 5, wherein the composition has a conductivity that is at least about 70% of the conductivity of the non-porous particulates.

7. The composition according any one of subparagraphs 4 to 6, wherein the porous particulates contain the at least one tracer.

8. The composition according to any one of subparagraphs 4 to 7, wherein the non-porous particulates contain the at least one tracer.

9. The composition according to any one of subparagraphs 4 to 8, wherein at least one of the non-porous particulates and the porous particulates have an apparent specific gravity that is less than 3.1 g/cm3.

10. The composition according to any one of subparagraphs 4 to 8, wherein at least one of the non-porous particulates and the porous particulates have an apparent specific gravity of from 3.1 to 3.4 g/cm3.

11. The composition according to any one of subparagraphs 4 to 8, wherein at least one of the non-porous particulates and the porous particulates has an apparent specific gravity that is greater than 3.4 g/cm3.

12. The composition according to any one of subparagraphs 4 to 11, wherein the composition has a conductivity that is at least equal to the conductivity of the non-porous particulates.

13. The composition according to any one of subparagraphs 4 to 12, wherein the non-porous particulate is selected from the group of light weight non-porous ceramic proppant, intermediate density non-porous ceramic proppant and high density non-porous ceramic proppant.

14. The composition according to any one of subparagraphs 4 to 13, wherein the porous particulate is selected from the group of light weight porous ceramic proppant, intermediate density porous ceramic proppant and high density porous ceramic proppant.

15. The composition according to any one of subparagraphs 1 to 14, wherein the at least one tracer does not degrade at temperatures greater than about 150° C.

16. The composition according to any one of subparagraphs 1 to 15, wherein the at least one tracer has a size in its longest dimension from about 100 nm to about 150 nm.

17. The composition according to any one of subparagraphs 1 to 16, wherein the at least one tracer is a nanoparticle including a dopant.

18. The composition according to subparagraph 17, wherein the dopant is attached to a nanoparticle substrate.

19. The composition according to subparagraphs 17 or 18, wherein the dopant includes one or more elements selected from the lanthanide series, the actinide series, transition metals having an atomic number of 21 or greater, or p-block metals having an atomic number of 31 or greater, or any combination thereof.

20. The composition according to subparagraph 18, wherein the dopant is monocationically or polycationically doped to the nanoparticle substrate.

21. The composition according to any one of subparagraphs 1 to 20, wherein the at least one particulate comprises a degradable coating or a non-degradable coating, and wherein the degradable coating degrades inside the fracture.

22. The composition according to subparagraph 21, wherein the degradable coating is selected from the group of polylactic acid, water-soluble polymers and cross-linkable water-soluble polymers.

23. A method of hydraulic fracturing a subterranean formation including: injecting a hydraulic fluid into a subterranean formation at a rate and pressure sufficient to open a fracture therein; and injecting a fluid containing a proppant composition, wherein the proppant composition comprises a plurality of particulates, at least one particulate of the plurality of particulates containing at least one tracer; and wherein the at least one tracer separates from the at least one particulate located inside a fracture after a period of time.

24. The method according to subparagraph 23, wherein the at least one particulate has a long term permeability measured in accordance with ISO 13503-5 at 7,500 psi of at least about 10 Darcies.

25. The method according to subparagraphs 23 or 24, wherein the plurality of particles contain porous particulate and non-porous particulates, wherein the non-porous particulates are selected from the group of light weight ceramic non-porous proppant, intermediate density ceramic non-porous proppant and high density ceramic porous proppant and wherein the porous particulates are selected from the group consisting of light weight ceramic porous proppant, intermediate density ceramic non-porous proppant and high density ceramic porous proppant.

26. The method according to any one of subparagraphs 23 to 25, wherein the tracer is a nanoparticle comprising a dopant.

27. The method according to subparagraph 26, wherein the dopant includes one or more elements selected from the lanthanide series, the actinide series, transition metals having an atomic number of 21 or greater, or p-block metals having an atomic number of 31 or greater, or any combination thereof.

28. The method according to subparagraphs 26 or 27, wherein the dopant is monocationically or polycationically doped to the nanoparticle substrate.

29. The method according to any one of subparagraphs 23 to 28, wherein the tracer has a size in its longest dimension from about 100 nm to about 150 nm.

30. The method according to any one of subparagraphs 23 to 29, wherein the at least one particulate including a degradable coating or a non-degradable coating, and wherein the degradable coating degrades inside the fracture.

31. The method according to subparagraph 30, wherein the degradable coating is selected from the group of polylactic acid, water-soluble polymers and cross-linkable water-soluble polymers.

32. A method of diagnostic evaluation of a hydraulic fracturing stimulation of a subterranean formation, including: injecting a hydraulic fluid into at least one stage of the subterranean formation at a rate and pressure sufficient to open a fracture therein, the subterranean formation including one or more formation fluids and the hydraulic fluid comprising a proppant composition comprising a plurality of particulates, at least one of particulate of the plurality of particulates containing at least one tracer; wherein the at least one tracer separates from the proppant composition continuously over a period of time; wherein the at least one tracer returns to the surface with the formation fluids; and wherein the at least one tracer is recovered and identified.

33. The method according to subparagraph 32, wherein the at least one tracer is a nanoparticle including a dopant, wherein the dopant is attached to a nanoparticle substrate.

34. The method according to subparagraph 33, wherein the dopant includes one or more elements selected from the lanthanide series, the actinide series, transition metals having an atomic number of 21 or greater, or p-block metals having an atomic number of 31 or greater, or any combination thereof.

35. The method according to subparagraphs 33 or 34, wherein the dopant is monocationically or polycationically doped to the nanoparticle substrate.

36. The method according to any one of subparagraphs 32 to 35, wherein the proppant composition includes a first particulate containing a first tracer and a second particulate containing a second tracer, wherein the first tracer separates from the first particulate in the presence of water and the second tracer separates from the second particulate in the presence of one or more hydrocarbons.

37. The method according to subparagraph 36, further comprising determining a rate of production of the water or the one or more hydrocarbons based on the tracers that are recovered and identified.

While the present invention has been described in terms of several exemplary embodiments, those of ordinary skill in the art will recognize that the invention can be practiced with modification within the spirit and scope of the appended claims.

The present disclosure has been described relative to several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of hydraulic fracturing a subterranean formation, comprising:
   injecting a hydraulic fluid into a subterranean formation at a rate and pressure sufficient to open a fracture therein; and
   injecting a fluid containing a proppant composition, wherein the proppant composition comprises a plurality of particulates, at least one particulate of the plurality of particulates comprising a nanoparticle metallic tracer; and
   wherein the nanoparticle metallic tracer separates from the at least one particulate when located inside the fracture after a predetermined period of time; and
   wherein the at least one particulate further comprises a coating that at least partially coats the at least one particulates.

2. The method of claim 1, wherein the at least one particulate has a long-term permeability measured in accordance with ISO 13503-5 at 7,500 psi of at least about 10 Darcies.

3. The method of claim 1, wherein the plurality of particulates contain porous particulate and non-porous particulates, wherein the non-porous particulates are selected from the group consisting of light weight ceramic non-porous proppant, intermediate density ceramic non-porous proppant and high density ceramic porous proppant and wherein the porous particulates are selected from the group consisting of light weight ceramic porous proppant, intermediate density ceramic non-porous proppant and high density ceramic porous proppant.

4. The method of claim 1, wherein the nanoparticle metallic tracer further comprising a dopant.

5. The method of claim 4, wherein the dopant comprises one or more elements selected from the lanthanide series, the actinide series, transition metals having an atomic number of 21 or greater, or p-block metals having an atomic number of 31 or greater, or any combination thereof.

6. The method of claim 4, wherein the dopant is monocationically or polycationically doped to the nanoparticle substrate.

7. The method of claim 1, wherein the tracer has a size in its longest dimension from about 100 nm to about 150 nm.

8. The method of claim 1, wherein the coating is a degradable coating or a non-degradable coating, and wherein the degradable coating degrades inside the fracture.

9. The method of claim 8, wherein the degradable coating is selected from the group consisting of polylactic acid, water-soluble polymers and cross-linkable water-soluble polymers.

* * * * *